(12) United States Patent
Anderson

(10) Patent No.: US 6,839,127 B1
(45) Date of Patent: Jan. 4, 2005

(54) OPTICAL RANGE FINDER HAVING A MICRO-MIRROR ARRAY

(75) Inventor: Noel Wayne Anderson, Fargo, ND (US)

(73) Assignee: Deere & Company, Moline, IL (US)

(*) Notice: Subject to any disclaimer, the term of this patent is extended or adjusted under 35 U.S.C. 154(b) by 0 days.

(21) Appl. No.: 10/662,865

(22) Filed: Sep. 15, 2003

(51) Int. Cl.[7] .............................................. G01C 3/08
(52) U.S. Cl. ................................................... 356/5.01
(58) Field of Search ...................... 356/4.01, 5.01–5.08, 356/602, 603, 606–608, 610, 614, 622

(56) References Cited

U.S. PATENT DOCUMENTS

| | | | |
|---|---|---|---|
| 4,572,625 A | | 2/1986 | Arndt et al. ................. 350/541 |
| 4,573,773 A | | 3/1986 | Arndt et al. ................. 350/541 |
| 4,687,326 A | * | 8/1987 | Corby, Jr. ................... 356/5.01 |
| 4,690,550 A | | 9/1987 | Kühne ........................... 356/5 |
| 5,022,723 A | | 6/1991 | Schmidt et al. .............. 350/1.2 |
| 5,061,049 A | | 10/1991 | Hornbeck .................... 359/224 |
| 5,600,478 A | | 2/1997 | Stevens ....................... 359/223 |
| 5,870,176 A | | 2/1999 | Sweatt et al. ................. 355/53 |
| 5,933,183 A | | 8/1999 | Enomoto et al. ........... 347/241 |
| 5,966,230 A | | 10/1999 | Swartz et al. ............... 359/196 |
| 6,031,605 A | | 2/2000 | Olbertz ..................... 356/141.4 |
| 6,040,909 A | * | 3/2000 | Hasegawa et al. .......... 356/614 |
| 6,059,188 A | | 5/2000 | diFazio et al. ......... 235/462.36 |
| 6,069,727 A | | 5/2000 | Cho et al. .................... 359/226 |
| 6,188,500 B1 | | 2/2001 | Rudeen et al. .............. 359/196 |
| 6,244,024 B1 | | 6/2001 | Diekhans et al. ......... 56/10.2 F |
| 6,359,718 B1 | | 3/2002 | Lin et al. .................... 359/224 |
| 6,437,854 B2 | * | 8/2002 | Hahlweg .................... 356/5.09 |
| 6,438,272 B1 | * | 8/2002 | Huang et al. ............... 382/286 |
| 6,525,863 B1 | * | 2/2003 | Riza ........................... 359/290 |
| 6,538,751 B2 | * | 3/2003 | Ono ........................... 356/614 |
| 6,618,123 B2 | * | 9/2003 | Uomori et al. ............ 356/3.12 |
| 6,657,711 B1 | * | 12/2003 | Kitagawa et al. ........... 356/155 |

OTHER PUBLICATIONS

Products Overveiw, Laser Measurement Systems–Outdoor [online] sick [retrieved on Nov. 30, 2001]. Retrieved from the Internet: <URL: http://www.sick.de/english/products/dat_products.asp?bannerback=0>.

Freudenrich, C.C. "How Projection Television Works" [online] [retrieved on Jan. 29, 2002]. Retrieved from the Internet: <URL: http://www.howstuffworks.com/projection–tv4.html>.

Riegl USA Scanners & Rangefinders for Surveying, Altimetry and other applications [online] Riegl USA [retrieved on Nov. 30, 2001]. Retrieved from the Internet: <URL: http://www.rieglusa.com/LMS–Z210.html>.

* cited by examiner

Primary Examiner—Bernarr E. Gregory
Assistant Examiner—Brian K Andrea

(57) ABSTRACT

An optical range finder for determining the distance of an object may comprise an optical source of electromagnetic radiation. A focusing optical member focuses the electromagnetic radiation upon a micro-mirror array. A processor controls the micro-mirror array to direct the focused electromagnetic radiation in a defined direction or a defined radiation pattern. A transmission optical member focuses the defined radiation pattern toward an object. A reception optical member receives electromagnetic radiation reflected from the object. A detector detects the receipt of the reflected electromagnetic radiation. A timer determines an elapsed time between transmission of the electromagnetic radiation to the object and receipt of the electromagnetic radiation from the object. A data processor converts elapsed time into a distance between the object and a reference point.

19 Claims, 3 Drawing Sheets

US 6,839,127 B1

OPTICAL RANGE FINDER HAVING A MICRO-MIRROR ARRAY

FIELD OF THE INVENTION

This invention relates to an optical range finder having a micro-mirror array.

BACKGROUND OF THE INVENTION

A range finder means an instrument or device used to determine the distance of an object from a reference point. In the prior art, a laser range finder may use a rotating mirror assembly to direct a beam transmitted from the laser range finder. If the laser range finder is exposed to dust or other particulate matter in an agricultural environment, the range of motion of the laser range finder may be impeded and performance may be degraded. Vibration of the laser range finder may lead to mechanical failure of one or more joints in a rotating mirror assembly of the laser range finder. Further, the mechanical components of a rotating mirror assembly are limited to a practical minimum size by manufacturing constraints and cost. The size of the rotating mirror assembly may be too large to accommodate a desired housing size for a laser range finder. Accordingly, a need exists for a laser range finder with one or more of the following characteristics: a compact housing, resistance to dust and other particulate matter, and reliability despite exposure to vibration.

A laser measurement system of the prior art may include a mechanically operated mirror, which scans through a certain requisite range of motion to reach a desired setting. Because such mechanical scanners must typically scan through a certain range of motion to reach a desired steering of a laser or light beam, the practical response time of the mechanical laser scanner detrimentally limits performance. To improve the scan rate of the mechanical scanner, a laser source may be reflected from a multi-sided rotating mirror or prism to produce a broad angular field of view of the laser source over a region. However, the rotating mirror arrangement is costly to manufacture and susceptible to mechanical failure, such as shock or vibration cracking the mirror or misaligning it.

SUMMARY OF THE INVENTION

An optical range finder for determining the distance of an object may comprise an optical source of electromagnetic radiation. A focusing optical member focuses the electromagnetic radiation upon a micro-mirror array. A processor controls the micro-mirror array to direct the focused electromagnetic radiation in a defined direction or a defined radiation pattern. A transmission optical member focuses the defined radiation pattern toward an object. A reception optical member receives electromagnetic radiation reflected from the object. A detector detects the receipt of the reflected electromagnetic radiation. A timer determines an elapsed time between transmission of the electromagnetic radiation to the object and receipt of the electromagnetic radiation from the object. A data processor converts the elapsed time into a distance between the object and a reference point.

DESCRIPTION OF THE PREFERRED EMBODIMENT

Figure 1:
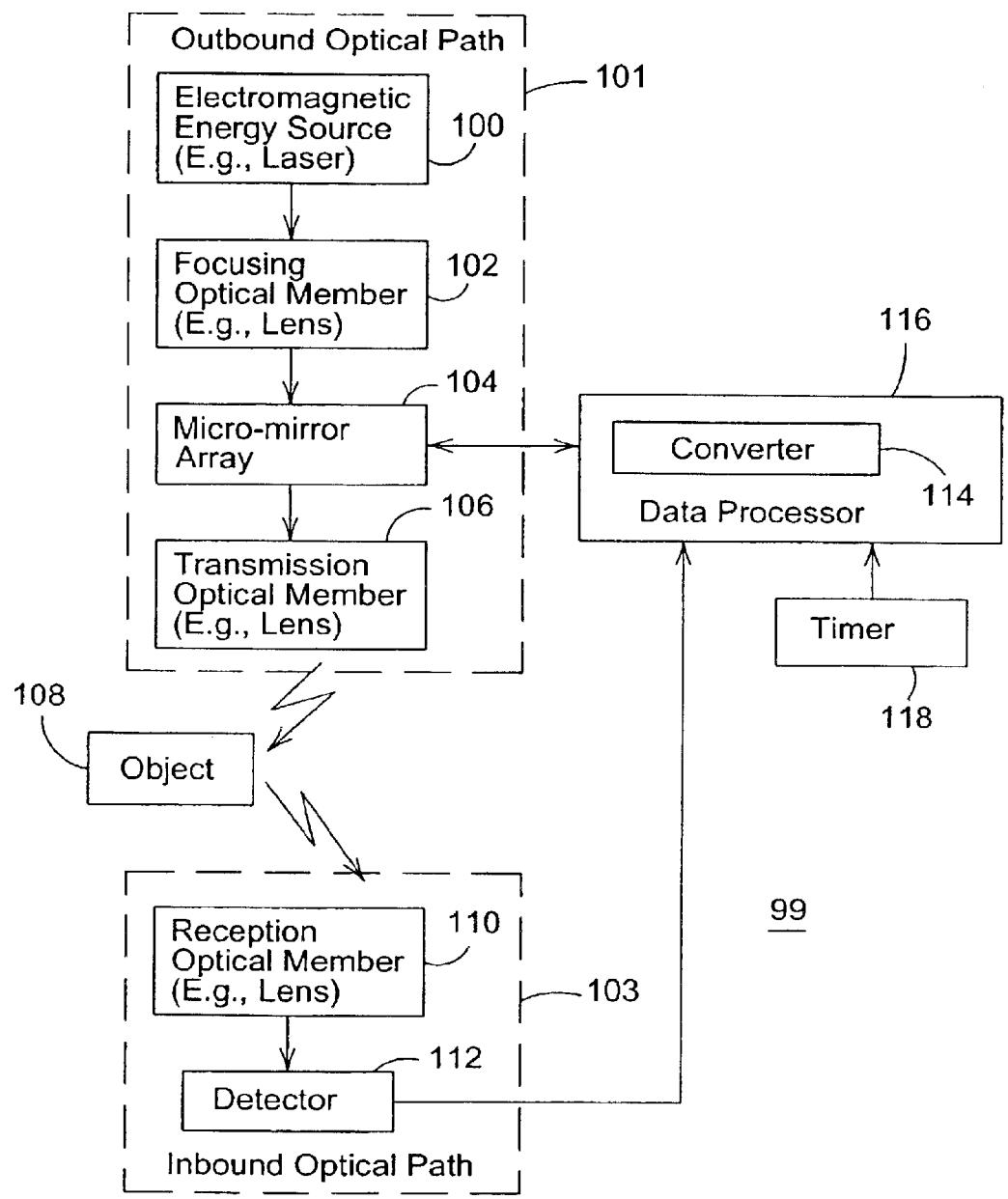
FIG. 1 is a block diagram of one embodiment of an optical range finder for estimating or determining a distance of an object from a reference point.

FIG. 1 shows a block diagram of an optical range finder 99 for determining the distance of an object 108 from a reference point. The reference point may be defined with reference to the range finder 99 or a portion thereof. The optical range finder 99 comprises an outbound optical path 101 and an inbound optical path 103. The outbound optical path 101 is associated with an electromagnetic signal (e.g., a pulse or pulse train) transmitted from the range finder 99 toward an object 108, whereas the inbound optical path 103 is associated with the reflected electromagnetic signal received by the range finder 99. The outbound optical path 101 comprises an electromagnetic energy source 100, a focusing optical member 102, a micro-mirror array 104, and a transmission optical member 106. The inbound optical path 103 comprises a reception optical member 110 and a detector 112.

The optical range finder 99 comprises an electromagnetic energy source 100 (e.g., a laser) that emits electromagnetic radiation (e.g., an infrared beam, near infra-red, ultraviolet, red light, a visual spectrum beam or another light beam) toward a focusing optical member 102 (e.g., a lens). In one embodiment, the electromagnetic energy source comprises a laser with an output power that is considered safe by U.S. and international standards. The focusing optical member 102 focuses the electromagnetic radiation upon a micro-mirror array 104. The focusing member 102 may expand the beam or form the beam into a linear beam. A data processor 116 controls the micro-mirror array 104 to direct the focused electromagnetic radiation (e.g., linear beam) in a defined direction or a defined radiation pattern. A transmission optical member 106 focuses the defined radiation pattern toward an object 108. A reception optical member 110 receives electromagnetic radiation reflected from the object 108. A detector 112 detects the receipt of the reflected electromagnetic radiation. For example, the detector 112 generates a detection signal proportional to the intensity of the received beam reflection. A timer 118 determines an elapsed time between transmission of the electromagnetic radiation to the object 108 and receipt of the electromagnetic radiation from the object 108. The elapsed time between when the beam leaves the finder and when it returns is used to determine the distance between the finder and the object 108. A data processor 116 converts the elapsed time into a distance between the object 108 and a reference point, such as the range finder. The distance (D) in meters to the object 108 or another point of the reflection is equal to the elapsed time (T) in seconds, divided by two and multiplied by the speed of light (C) in meters per second. That is, D=TC/2.

The micro-mirror array 104 comprises arrays of reflective members associated with a substrate. Reflective members may be energized individually or in sequence to scan over a desired area (e.g., field of view). Each reflective member may be energized via one or more capacitive plates or conductive members to deform, and hence, steer the reflective member. More than one mirror may reflect the light at one time, resulting in a larger beam than if just a single mirror reflected the beam. Accordingly, the output beam size, intensity or both may be dynamically adjusted. Further, the range finder 99 can provide a smoother scan line or greater resolution scan line by changing a fraction of the asserted mirrors comprising the beam. Adjustments to the beam may be accomplished dynamically without any limitation from the rotation rate of a multi-sided mechanical mirror of prior art systems.

In one embodiment, elastomers are added between the reflective member and the substrate to decrease the response time from deformation to rest after the energy is removed from a member. The elastomer associated with the reflective elements may be used to improve the range of motion of the reflective elements, which in turn, improves the angular scan range. The elastomer associated with the reflective elements may lower the energy or voltage needed to control the micro-mirror array. Micro-mirror arrays may be fabricated by semiconductor and integrated circuit fabrication techniques. Features of micro-mirror arrays may be constructed of one or more of the following: silicon, silicon oxide, silicon nitride, aluminum, silver, and nickel.

A micro-mirror array may comprise a micro-electromechanical system (MEMS), a compliant micro-electromechanical system (CMEMS) or another device. The tilt or movement of the mirror are controlled by electrostatic charges applied to electrodes. Semi-conductor switches, such as complementary metal oxide semiconductor (CMOS) transistors, may be used to control the position of the mirrors by electrostatic deflection and sense the position of the mirrors by capacitive sensing.

The micro-mirror array 104 allows a user to randomly activate different elements, rather than scanning in a particular sequence, as might be required with mechanical laser scanners. The micro-mirror array 104 may provide data on a region in terms of coordinates, intensity, and distance.

A micro-mirror array 104 may be energized to project a linear arrangement of pixels or other patterns of structured light. A micro-mirror array 104 may be energized to provide pulses of light or emissions, where time of flight is measured from a reflective obstacle. The micro-mirror array 104 comprises a micro-electromechanical device that supports the output of a randomly accessible beam position and a variable beam size. The micro-mirror array 104 allows great flexibility in range data collection with the potential to greatly increase efficiency of data collection. For example, a large beam with a small set of data points can be used to identify where object 108s of potential interest lie. A smaller beam at higher scan resolution can then be used to gather high density data in just the regions of interest. There can be significant data collection efficiency improvements by doing the large, course scan followed by a small high resolution scan, rather than taking high resolution scan of the whole scene and then process the data to extract information in the areas of interest.

The multi-plexed micro-mirror array 104 disclosure includes establishing a scanning pattern or energization pattern for the micro-mirror array 104. Activating each successive member of the micro-mirror array 104 prior to the time the member is actually required to minimize the delay associated with activating and moving the member. That is, the offset between energy activation of successive members is minimized. Micro-mirror array 104 provides random access to mirror positioning to produce fixed structured light. Micro-mirror array 104s support the detection of gaps (of stunted plant growth or previously harvested area) in the crop edge.

Figure 2:
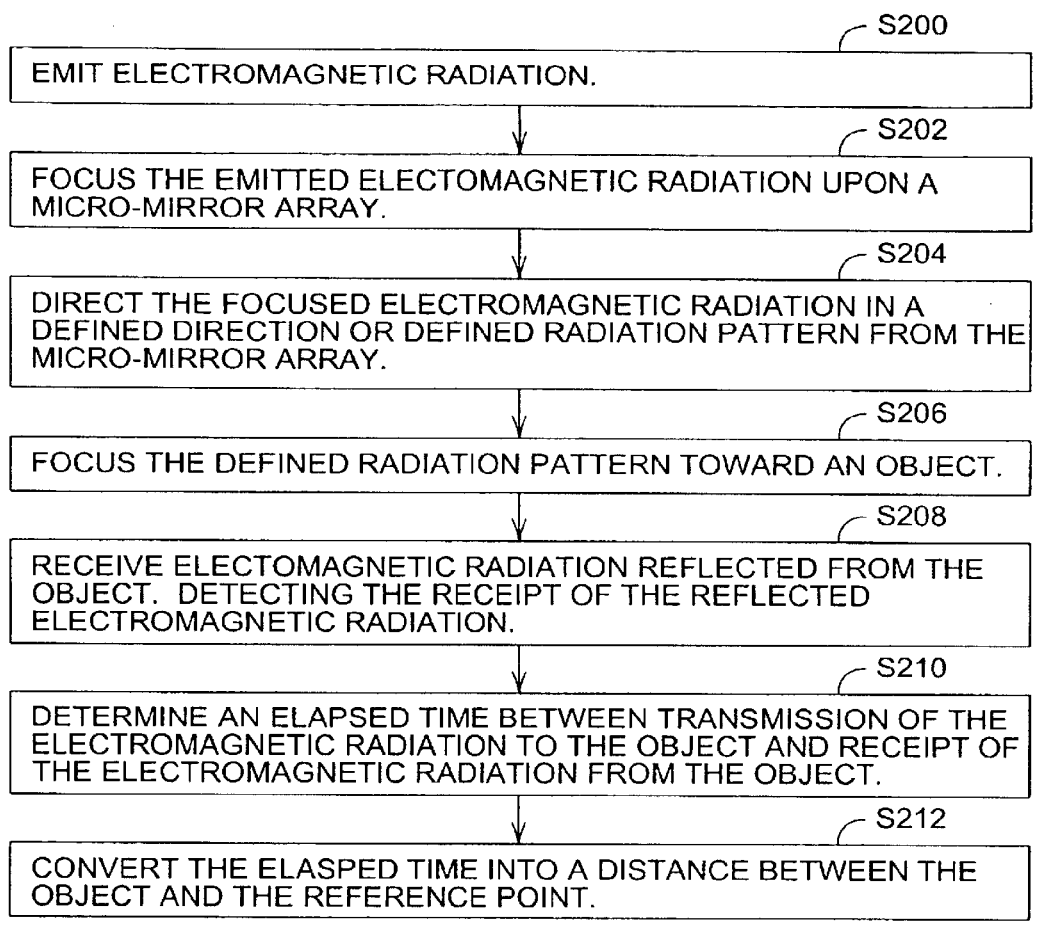
FIG. 2 is a method for determining a distance or range of an object from a reference point.

FIG. 2 is a flow chart of a method for determining a distance of an object 108 from a reference point. The method of FIG. 2 begins in step S200.

In step S200, an electromagnetic energy source 100 emits electromagnetic radiation.

In step S202, a focusing optical member 102 focuses the electromagnetic radiation upon a micro-mirror array 104. In one example, a lens, as the focusing optical member 102, may focus the electromagnetic radiation upon the micro-mirror array 104. In another example, a diffraction grating, as the optical member, focuses the electromagnetic energy upon the micro-mirror array 104.

In step S204, the micro-mirror array 104 directs the focused electromagnetic radiation in a defined direction or defined radiation pattern toward an object 108 (e.g., a plant, obstacle, crop, crop edge, or stubble).

In step S206, the transmission optical member 106 focuses the defined radiation pattern. For example, a transmission lens, as a transmission optical member 106, focuses the defined radiation pattern.

In step S208, a reception optical member receives electromagnetic radiation reflected from the object 108. For example, a reception lens receives electromagnetic radiation reflected from the object 108 and focuses the received electromagnetic radiation on a detector 112.

In step S210, a detector 112 detects the receipt of the reflected, received, electromagnetic radiation. For example, the detector 112 may represent a charge-coupled device, an cadmium sulfide sensor or another sensor that emits an electrical signal when electromagnetic energy, such as light, is incident upon the sensor.

In step S212, a data processor 116 determines an elapsed time between transmission of the electromagnetic radiation to the object 108 and receipt of the electromagnetic radiation from the object 108.

In step S214, a data processor 116 or a converter converts the elapsed time into a distance between the object 108 and the reference point. The distance between the object 108 and the reference point may be used as an input to a guidance system of a work vehicle, such as an agricultural machine, a combine, a harvester, a tractor or otherwise.

Figure 3:
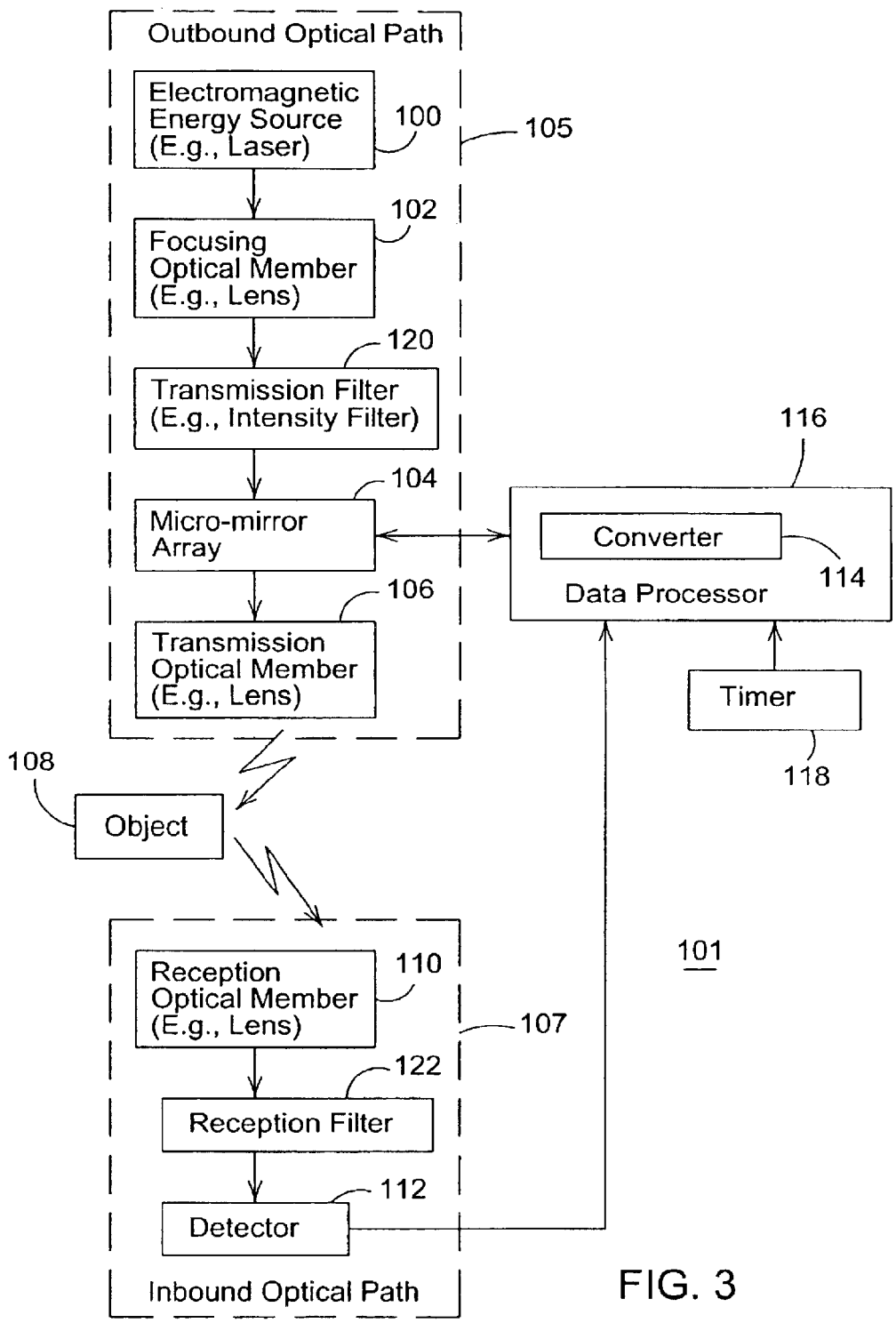
FIG. 3 is a block diagram of another embodiment of an optical range finder for estimating or determining a distance of an object from a reference point.

FIG. 3 is a block diagram of an alternate embodiment of a range finder. The range finder of FIG. 3 is similar to the range finder of FIG. 1, except the range finder of FIG. 3 further includes a transmission filter 120 and a reception filter 122. Like elements in FIG. 1 and FIG. 3 indicate like elements.

The optical range finder 101 comprises an outbound optical path 105 and an inbound optical path 107. The outbound optical path 105 is associated with an electromagnetic signal (e.g., a pulse or pulse train) transmitted from the range finder 101 toward an object 108, whereas the inbound optical path 107 is associated with the reflected electromagnetic signal received by the range finder 101. The outbound optical path 105 comprises an electromagnetic energy source 100, a focusing optical member 102, a transmission filter 120, a micro-mirror array 104, and a transmission optical member 106. The inbound optical path 107 comprises a reception optical member 110, a reception filter 122, and a detector 112.

In one embodiment, the transmission filter 120 comprises an intensity filter. For example, the intensity filter may represent a liquid crystal display or a disk with various levels of transparency. The intensity may be diminished to maintain eye safe output levels It may also be diminished to limit the maximum distance from which a return signal may be detected. This would automatically filter out object 108s from outside a range of interest. It would also allow the scanning rate to be increased since the time per acquired data point is limited by the maximum bean round-trip time to the most distance object 108 that may generate a return. The intensity filter might also be placed between the micro-mirror arrays and the transmission optics, but in the location shown, the mirror array is saved from extra heat from the full electromagnetic radiation generated by the source incident on it.

Having described the preferred embodiment, it will become apparent that various modifications can be made without departing from the scope of the invention as defined in the accompanying claims.

What is claimed is:

1. An optical device for measuring a distance between the optical device and an object, the optical device comprising:
   an optical source for emitting beam of electromagnetic radiation; a first lens for focusing the beam of electromagnetic radiation into a micro-mirror-incident pattern;
   a micro-mirror array receiving the micro-mirror-incident pattern and outputting a controlled radiation pattern;
   a processor for selecting the controlled radiation pattern based on at least one input;
   a second lens for focusing the controlled radiation pattern toward an object for estimation of a distance of the object from the optical device;
   a third lens for collecting a reflection of the electromagnetic radiation from the object;
   a sensor for receiving the reflection and providing an output signal to the processor; and
   a timer associated with the processor for determining an elapsed time between transmission of an electromagnetic radiation from the source and the reception of the reflection at the sensor, the elapsed time indicative of a distance between the optical device and the object.

2. The optical device according to claim 1 wherein the micro-mirror array comprises a microelectromechanical system.

3. The optical device according to claim 1 wherein the micro-mirror array comprises an array of deformable surfaces and a controller for controlling the array to direct the controlled radiation pattern.

4. The optical device according to claim 1 wherein the controlled radiation pattern comprises at least one of a first pattern for scanning a field of view, a second pattern for covering a sample of the field of view, and a third pattern for covering a sub-area of the field of view.

5. The optical device according to claim 1 wherein the controlled radiation pattern has a beam size determined by reflective contributions from multiple mirrors of the micro-mirror array.

6. The optical device according to claim 1 wherein the controlled radiation pattern has a central beam that is steered gradually to a desired angular orientation without varying from the desired angular orientation by more than a maximum tolerance.

7. The optical device according to claim 1 wherein the optical source is a laser.

8. The optical device according to claim 1 wherein a filter is interposed between the third lens and the sensor, the filter adapted to filter or reject at least one frequency of the reflected electromagnetic radiation.

9. An optical system for determining the range of an object, the optical system comprising:
   an optical source of electromagnetic radiation,
   a first transmitting lens for focusing or collimating the electromagnetic radiation;
   a micro-mirror array for directing the focused electromagnetic radiation in a defined direction or pattern,
   a second transmitting lens for focusing the electromagnetic radiation reflected from the micro-mirror array;
   a processor is arranged to control the micro-mirror array to direct the focused radiation in the defined direction or pattern toward an object;
   a receiving lens for receiving electromagnetic radiation reflected from the object,
   a sensor for detecting the receipt of the reflected electromagnetic radiation;
   a timer for determining an elapsed time between transmission of the electromagnetic radiation to the object and receipt of the electromagnetic radiation from the object;
   a converter for converting the elapsed time into a distance between the object and the optical system.

10. A method for determining a distance of an object from a reference point, the method comprising:
    emitting electromagnetic radiation; focusing the electromagnetic radiation upon a micro-mirror array;
    directing the focused electromagnetic radiation in a defined direction or defined radiation pattern toward an object; focusing the defined radiation pattern;
    receiving electromagnetic radiation reflected from the object; detecting the receipt of the reflected electromagnetic radiation;
    determining an elapsed time between transmission of the electromagnetic radiation to the object and receipt of the electromagnetic radiation from the object; and
    converting the elapsed time into a distance between the object and the reference point.

11. The method according to claim 10 further comprising:
    filtering the electromagnetic radiation received from the energy source to control the intensity range of incident electromagnetic radiation upon a micro-mirror array.

12. The method according to claim 10 further comprising:
    filtering the electromagnetic radiation received from the energy source to control the intensity range of incident electromagnetic radiation upon the detector.

13. The optical system according to claim 9 wherein the micro-mirror array comprises a microelectromechanical system.

14. The optical system according to claim 9 wherein the micro-mirror array comprises an array of deformable surfaces and a controller for controlling the array to direct the controlled radiation pattern.

15. The optical system according to claim 9 wherein the pattern comprises at least one of a first pattern for scanning a field of view, a second pattern for covering a sample of the field of view, and a third pattern for covering a sub-area of the field of view.

16. The optical system according to claim 9 wherein the pattern has a beam size determined by reflective contributions from multiple mirrors of the micro-mirror array.

17. The optical system according to claim 9 wherein the pattern has a central beam that is steered gradually to a desired angular orientation without varying from the desired angular orientation by more than a maximum tolerance.

18. The optical system according to claim 9 wherein the optical source is a laser.

19. The optical system according to claim 9 wherein a filter is interposed between the receiving lens and the sensor, the filter adapted to filter or reject at least one frequency of the reflected electromagnetic radiation.

* * * * *